(12) United States Patent
Sugai et al.

(10) Patent No.: US 6,683,885 B1
(45) Date of Patent: Jan. 27, 2004

(54) NETWORK RELAYING APPARATUS AND NETWORK RELAYING METHOD

(75) Inventors: Kazuo Sugai, Ebina (JP); Takeshi Aimoto, San Jose, CA (US); Takeki Yazaki, Hachioji (JP); Nobuhito Matsuyama, Hadano (JP); Yoshihito Sako, Sagamihara (JP); Tomohiko Tanabe, Hadano (JP)

(73) Assignees: Hitachi, Ltd., Tokyo (JP); Hitachi Information Technology Co. Ltd., Kanagawa-ken (JP)

( * ) Notice: Subject to any disclaimer, the term of this patent is extended or adjusted under 35 U.S.C. 154(b) by 0 days.

(21) Appl. No.: 09/511,798

(22) Filed: Feb. 23, 2000

Related U.S. Application Data

(63) Continuation-in-part of application No. 09/266,635, filed on Mar. 11, 1999, now Pat. No. 6,560,233.

(30) Foreign Application Priority Data

Feb. 24, 1999 (JP) .......................................... 11-045959

(51) Int. Cl.⁷ .............................................. H04L 12/56
(52) U.S. Cl. ........................ 370/423; 370/389; 709/238
(58) Field of Search ................................ 370/362, 389, 370/392, 395, 422, 423, 428; 709/238

(56) References Cited

U.S. PATENT DOCUMENTS 4,692,917 A * 9/1987 Fujioka ....................... 370/392
5,434,863 A    7/1995 Onishi et al.
5,764,895 A * 6/1998 Chung ......................... 709/250
5,838,677 A * 11/1998 Kozaki et al. .............. 370/389
5,884,040 A * 3/1999 Chung ......................... 709/227
5,920,566 A * 7/1999 Hendel et al. .............. 370/401
6,032,190 A * 2/2000 Bremer et al. .............. 709/238
6,259,699 B1 * 7/2001 Opalka et al. .............. 370/398

* cited by examiner

Primary Examiner—Hassan Kizou
Assistant Examiner—D Levitan
(74) Attorney, Agent, or Firm—Mattingly, Stanger & Malur, P.C.

(57) ABSTRACT

A network relaying apparatus and a network relaying method for securing a high communication quality (QoS), a high reliability and security. A transfer engine stores the packets received through at least a network interface in a packet buffer, and the header information in a header RAM. A search engine searches for the transfer control information such as the destination information and the action information based on the header information, and writes them in the header RAM. The transfer engine prepares an output packet based on the information stored in the packet buffer and the header RAM, and outputs the output packet to the destination. A switch switches the output packet to the routing processor of the destination. Each header RAM is asynchronously accessible independently of the packet buffer and suppresses the competition for access between the transfer engine and the search engine.

10 Claims, 13 Drawing Sheets

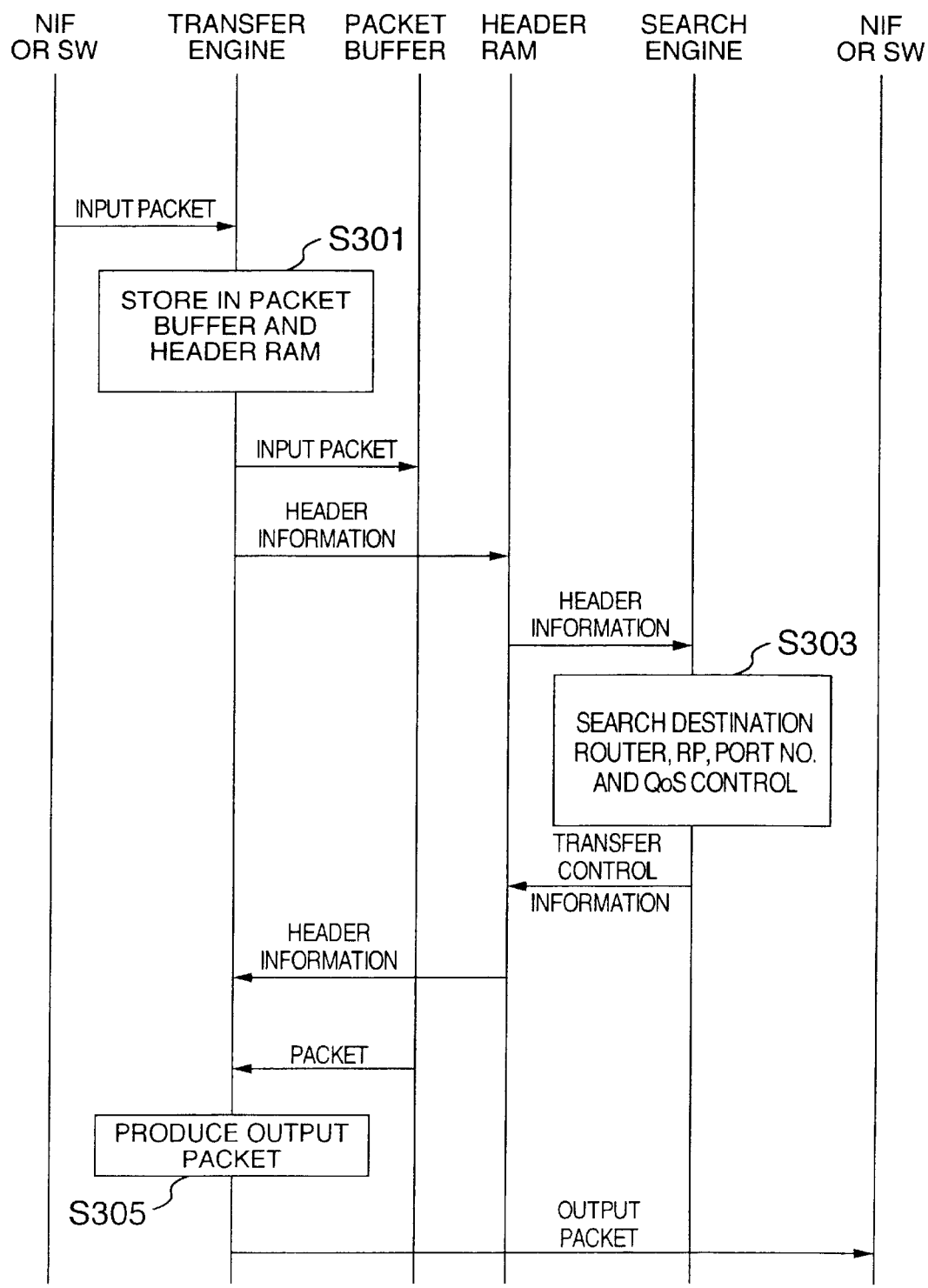

FIG. 4A  PACKET FORMAT
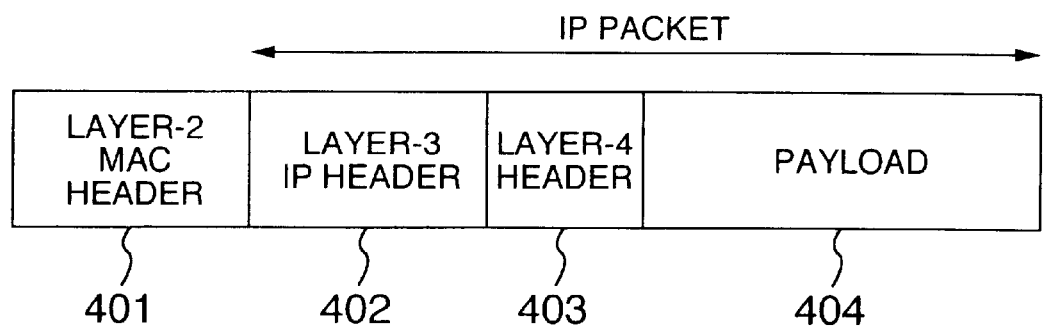
FIG. 4B  FORMAT OF HEADER INFORMATION
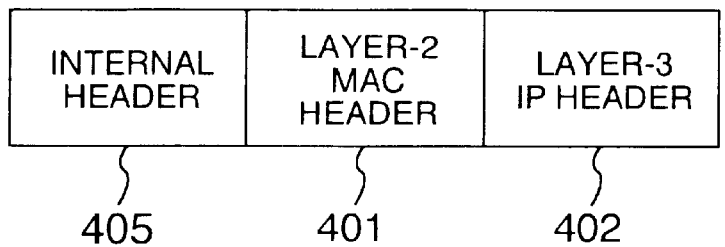

FIG. 5A  FORMAT OF EACH ENTRY IN ROUTE TABLE
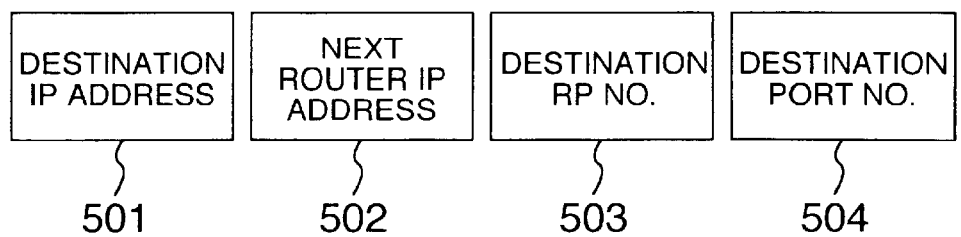
FIG. 5B  FORMAT OF EACH ENTRY IN ARP TABLE
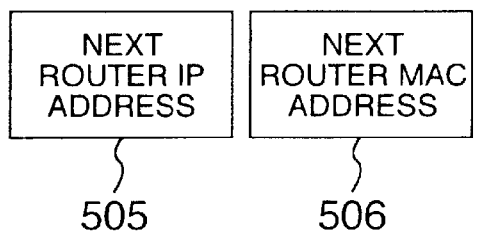
FIG. 5C  FORMAT OF EACH ENTRY IN FILTER / QoS TABLE
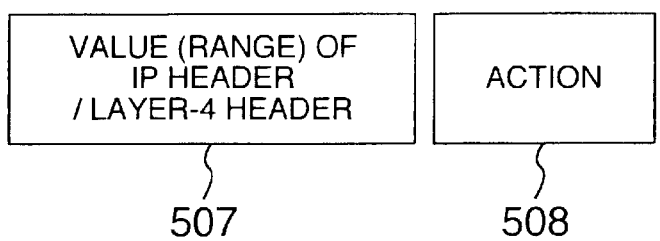

NETWORK RELAYING APPARATUS AND NETWORK RELAYING METHOD

CROSS-REFERENCE TO RELATED APPLICATIONS

This application is a CIP of U.S. Ser. No. 09/266,635, filed Mar. 11, 1999, now U.S. Pat. No. 6,560,233. This application is copending with three applications, U.S. Ser. No. 09/511,799, filed Feb. 23, 2000; Ser. No. 09/511,801, filed Feb. 23, 2000; and Ser. No. 09/511,797, filed Feb. 23, 2000, being filed by the same applicants as those of this application, based on Japanese patent applications Nos. 11-046422, 11-046837 and 11-046579 filed on Feb. 24, 1999, respectively and assigned to the present assignee. The contents of these applications are incorporated by reference herein.

BACKGROUND OF THE INVENTION

The present invention relates to a network relaying apparatus and a network relaying method, or in particular to a network relaying apparatus including a router of a computer network system which is capable of searching at high speed for a destination of a packet input and a network relaying search method.

Generally, in a network system, a network relaying apparatus such as a router or a bridge is used for connecting a plurality of networks. The router checks the destination address of a packet received from a network or a subnet connected, determines the destination of the packet, and transfers the packet to a network or a subnet which is connected with the destination router or host.

FIG. 13 is a diagram showing a configuration of a conventional network relaying apparatus. In FIG. 13, a router 100 includes a routing manager (RM) 110, router buses 120, network interfaces (NIF) 130 and ports 140. Each port 140 is connected to an appropriate network 150.

Each network interface 130 receives a packet from a network connected to the port 140, and transmits the received packet through the router bus 120 to the routing manager 110. The routing manager 110 includes a routing table for holding the routing information, and using this routing information, determines the network 150 of the destination from the address of the packet received, and transmits the packet to the network interface 130 of the port 140 connected to the network 150. The network interface 130 that has received the packet from the routing manager 110 sends out the packet to the destination network 150. The routing manager 110 updates and maintains the routing information held in the routing table based on the header information of the packet received, and has the function of overall management of the router 100.

An explanation will be given of the route search process for searching for a port outputting the next address to which the packet is to be transferred upon receipt of the packet and outputting the packet. Normally, the route search uses a route search table (routing table) prepared from the component definition information and the information obtained by exchange between the routers. The routing table is for searching the information (next hop information) as to the output port, the next hop address and whether the network is directly connected or not with a set of the network address and the network mask length as a key.

As another conventional system, JP-A-05-199230 (U.S. Pat. No. 5,434,863) discloses an internetwork system and a communication network system which can flexibly meet the size requirement of the network without adversely affecting the high-speed routing process. In these systems, a router manager and a plurality of routing accelerator modules are coupled to each other with a high-speed bus Also, each routing accelerator is connected with a plurality of independent communication ports. In these conventional systems, a plurality of the routing accelerators makes possible a high-speed routing and by adding the routing accelerators, the requirement for increasing the network size can be easily met.

SUMMARY OF THE INVENTION

In recent years, the demand has increased for the dynamic routing in which the relaying information for routing is dynamically generated, added, changed or deleted by recognizing the configuration of the network in operation. Specifically, the router requires the processing of the routing protocol (such as the Routing Information Protocol (RIP) or Open Shortest Path First (OSPF) included in TCP/IP protocol group) for exchanging information on the network between the routers. Further, the processing of the network management protocol (such as Simple Network Management Protocol (SNMP) which is one of the TCP/IP protocol group) for communication of the management information such as the performance of the router with a management master station on the network is performed unavoidably by the routing means in the prior art. This makes it impossible for the router to exhibit the relaying performance sufficiently. The conventional router, therefore, cannot easily meet the requirement of the high-speed lines such as the high-speed LAN (Local Area Network), the wide-band ISDN (Integrated Services Digital Network) and ATM (Asynchronous Transfer Mode) that have recently found practical applications.

Also, in the conventional router which has routing means only at one part, the number of the ports and the communication traffic that can be supported is limited. It is therefore difficult to expand the structure of the port menu or improve the performance of the router smoothly in accordance with the traffic and the number of ports.

On the other hand, with the increase in the speed of the network, the data processing system used with the router and the bridge requires an increased speed of the network controller reading transmission packets from a memory or writing the received packets into a memory. Further, in order to compensate for the performance reduction due to the competition with the processor for memory access, the conventional system is required to limit the number of network controllers incorporated therein or requires, though low in cost effectiveness, the use of a high-speed memory or a dual port memory accessible from the processor or the network controller asynchronously.

The router is connected with a plurality of networks and relays the packets without connection. For this reason, packets may be concentrated in a router. Therefore, the prior art cannot secure the quality of service (QoS) such as the band control, the priority control or the discard control (for example, the band cannot be secured or packets cannot be transmitted within a specified time).

In view of the facts described above, an object of the present invention is to provide a network relaying apparatus and method capable of high-speed routing while assuring a high quality of service (QoS), high reliability and security.

Another object of the invention is to provide a relaying apparatus and method of high applicability and high expandability which can meet the requirement for a variety of lines and sizes and is easy to improve the system performance.

Still another object of the invention is to provide a relaying apparatus and method in which the types of protocol that can be processed can be increased to facilitate the connection with the existing systems.

Yet another object of the invention is to execute high-speed operation of route search or the like by use of a high-speed memory as some of the parts into which the storage unit is divided.

A further object of the invention is to improve the packet processing capacity by suppressing the competition for access to the memory for storing packets without using any unnecessarily high-speed memory or a dual-port memory.

According to a first aspect of the invention, there is provided a network relaying apparatus connecting a plurality of networks for transferring packets input from the networks to the next destination based on the route information, comprising:

at least a network interface connected to the networks for controlling the interface with the networks;

at least a routing processor having a packet buffer and a header memory readable and writable at high speed and connected with one or a plurality of network interfaces for routing the packets input from the network interfaces;

a routing manager for managing the internal parts of the apparatus; and a connector for connecting the routing manager and a plurality of the routing processors respectively;

wherein the first network interface outputs the packets input from the networks to the first routing processor connected with the first network interface;

wherein the first routing processor stores the input packets in a packet buffer and the header information on the input packets in a header memory;

wherein the header memory is accessed to search for the destination of the input packets stored in the packet buffer based on the stored header information;

wherein an output packet is produced from the input packet stored in the packet buffer and the header information stored the header memory;

wherein the output packet is output to the connector in the case where the searched route to the destination is passed through another routing processor; and wherein the connector transmits the output packet from the first routing processor to a second routing processor of the searched destination.

According to a second aspect of the invention, there is provided a network relaying method for a network relaying apparatus comprising a network interface connected to the networks, a routing processor for routing the packets input from the network interfaces, a routing manager for managing the internal parts of the system, a connector for connecting a plurality of the routing processors, and means for outputting the packets input from the networks to the destination, comprising the steps of;

causing the first network interface to output the packets input from the network to the first routing processor connected with the first network interface;

causing the first routing processor to store the input packets in a packet buffer and the header information on the input packet in a high-speed readable and writable header memory independent of the packet buffer;

causing the first routing processor to access the header memory and search for a destination of the input packet stored in the packet buffer based on the stored header information;

causing the first routing processor to produce an output packet from the input packet stored in the packet buffer and the header information stored in the header memory;

causing the first routing processor to output the output packet to the connector in the case where the route to the searched destination passes through another routing processor; and causing the connector to transmit the output packet input from the first routing processor to the second routing processor of the searched destination.

Other objects, features and advantages of the present invention will become apparent from the following description of the embodiments of the invention taken in conjunction with the accompanying drawings.

BRIEF DESCRIPTION OF THE DRAWINGS

FIG. 3 is a sequence diagram showing an outline of the operation of the network relaying apparatus.

FIGS. 4A–4B are diagrams for explaining a packet buffer and a header RAM (Random Access Memory).

FIGS. 5A–5C are diagrams for explaining each table used for route search.

DESCRIPTION OF THE EMBODIMENTS

Detailed description of embodiments of the invention is made with reference to the drawings.

Figure 1:
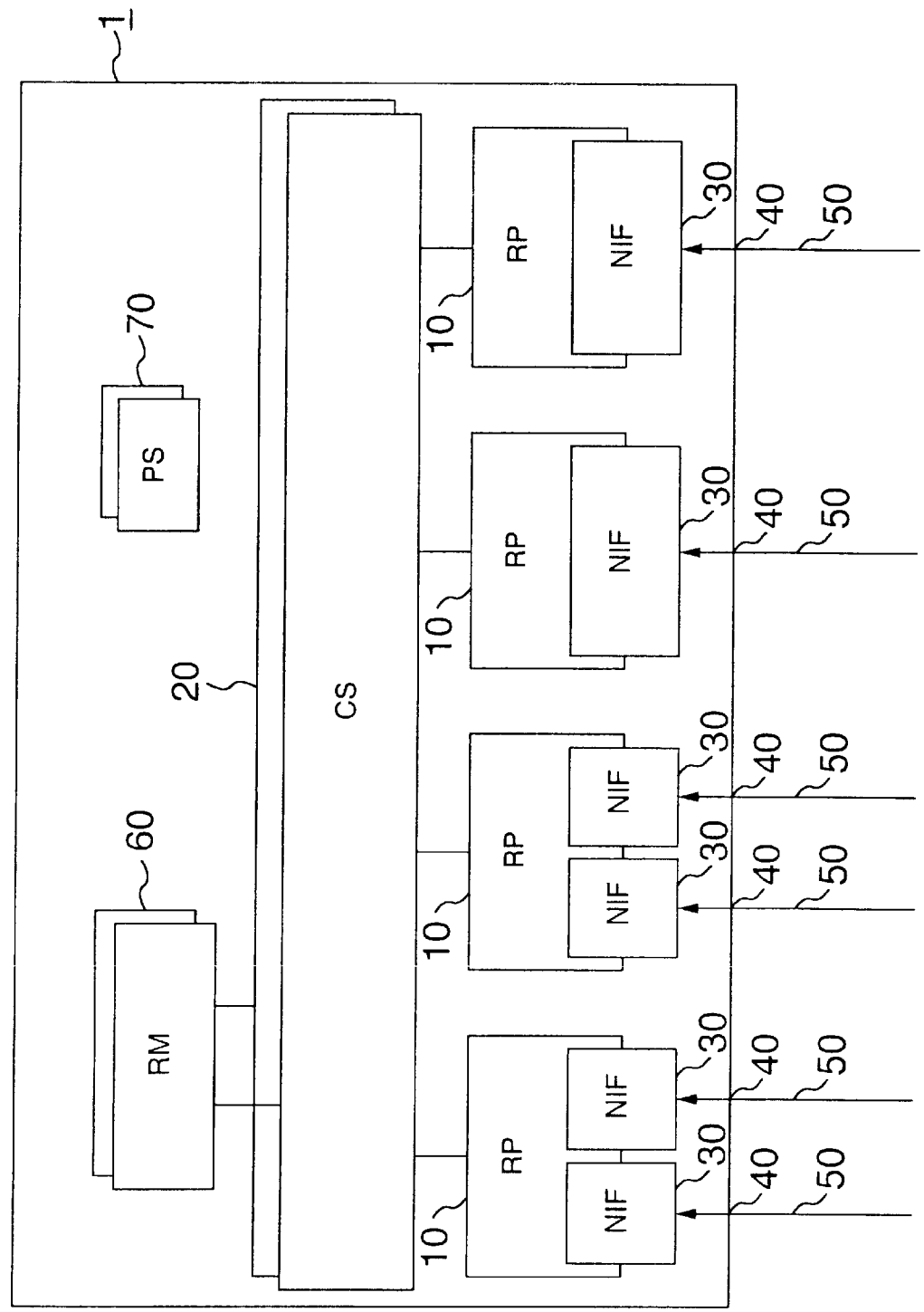
FIG. 1 is a diagram showing a configuration of a network relaying apparatus according to the present invention.

FIG. 1 is a diagram showing a configuration of a network relaying apparatus according to this invention. A router 1 includes a plurality of routing processors (RP) 10, a crossbar switch (CS) 20, at least a network interface (NIF) 30, at least a port 40, a routing manager (RM) 60 and a power supply (PS) 70. Each port 40 is connected to an appropriate network. The network 50 is a LAN, a WAN (Wide Area Network) or an ATM, for example. For assuring an improved reliability of the apparatus, the power supply 70 or each common part can be doubled as required.

The routing manager function is divided into the routing processors 10 for executing the routing function and the routing manager 60 for managing the router 1. Further, the router 1 includes a plurality of routing processors 10 each having one or a plurality of network interfaces 30. The routing manager 60 has the function of overall management of the router 1 and at the same time executes the route calculation function. Further, the routing manager 60 exchanges the routing information with other routers and distributes the routing information to each routing processor 10 within each router. The routing manager 60 has a dual structure. The switch 20 has a crossbar switch or the like for communication and exchange between the routing processors 10 or between a routing processor 10 and the routing manager 60. The switch 20 is also formed in dual structure in the case under consideration. The switch 20 may be replaced with a bus or the like for connection. Also, in the case where the crossbar switch is used, the connection route is not occupied by the routing manager 60 and one of the routing processors 10 but can be shared by a plurality of the routing processors 10 at the same time.

Each routing processor 10 transfers packets through the network interface 30 connected thereto. A given routing processor 10 can also transfer a packet to the network 50 connected to another routing processor 10 through the switch 20. The routing processors 10 have each function thereof designed to perform a high-speed operation. More specifically, the routing processors 10 have such functions as switching, route search, forwarding, filtering, offering QoS and IP (Internet Protocol) multicasting. Each routing processor 10 has an appropriate input buffer and an output buffer for each port 40 of the network interface 30 within it or for each of the other routing processors 10 and the routing manager 60. Each network interface 30 has one or a plurality of ports 40 for controlling the interface between the networks 50 and the routing processors 10.

Figure 2:
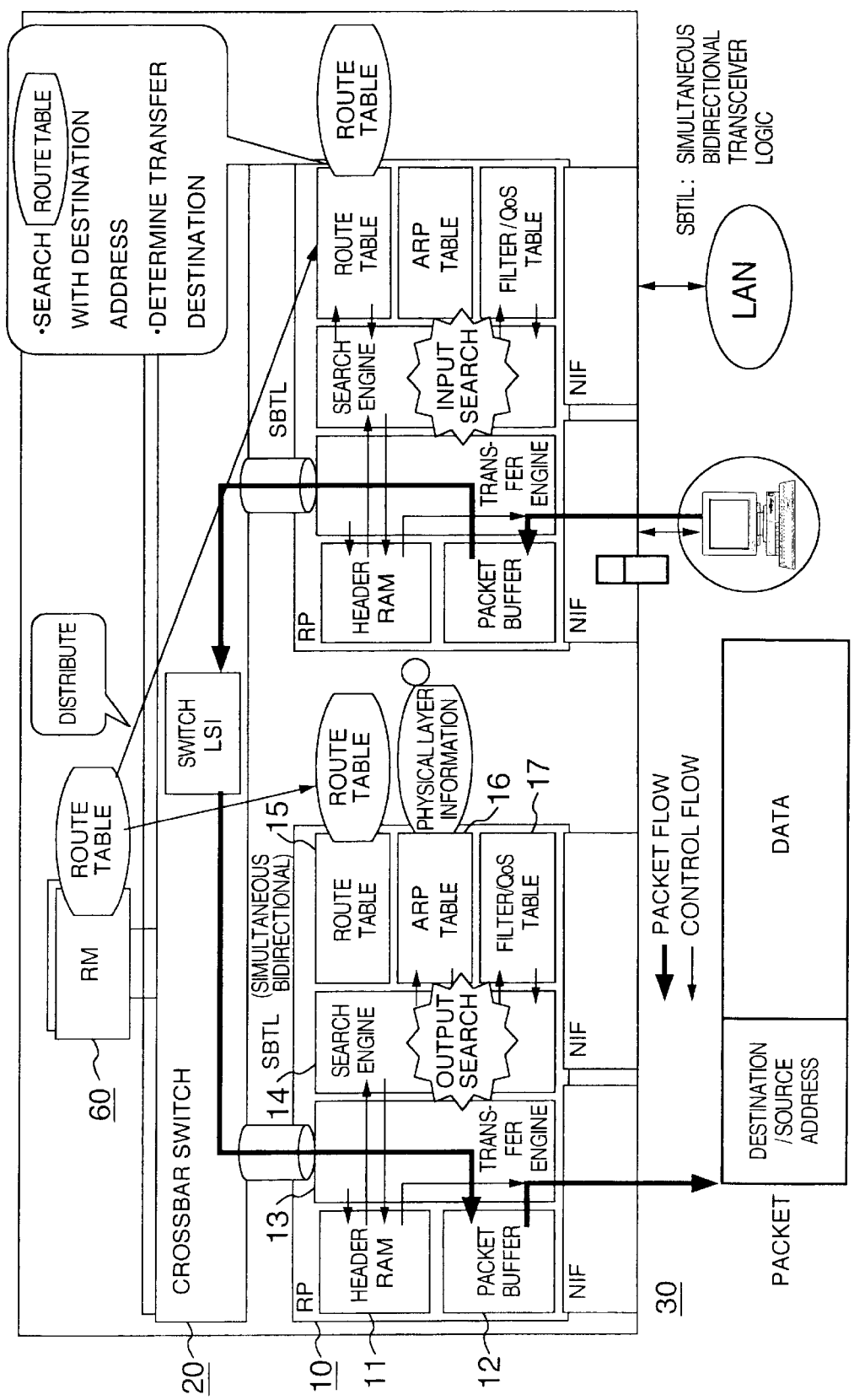
FIG. 2 is a diagram showing an internal structure of a routing processor for explaining the operation of a network relaying apparatus.

FIG. 2 is a diagram showing the internal structure of the routing processor for explaining the operation of the network relaying apparatus. With reference to this diagram showing the internal structure of the routing processor 10, an explanation will be given of the operation of searching the route and transferring packets to the destination determined as the result of the route search.

The routing processors 10 each includes a transfer engine 13, a search engine 14, a header RAM 11, a packet buffer 12, a route table 15, an ARP (address resolution protocol) table 16, and a filter/QoS (flow search table) 17. The transfer engine 13 performs the packet input/output processing, for example. The search engine 14 mainly performs the route search and the flow search such as the QoS control based on the header information of the packet. The search engine 14 is configured with an exclusive LSI (Large Scale Integrated Circuit) or the like hardware capable of high-speed processing.

The packet buffer 12 has the packet stored therein until the transfer engine 13 transfers the input packet to the routing processor 10. The header RAM 11 extracts and stores only the header of the input packet. The header RAM 11 is configured of a memory having a high read/write speed. This embodiment, in addition to the buffer memory for storing the packets received from the network or transferred from other data processing systems, comprises a header RAM 11 accessible asynchronously with the packet buffer 12. Thus, the packet is stored in the packet buffer 12 while storing (copying) the header of the packet in the RAM 11 at the same time. Each processor of the transfer engine 13 and the search engine 14 fetches the header of the packet by use of the header RAM 11, and while analyzing the header, the operation of reading/writing of the packet from or into the packet buffer 12 becomes possible. In this way, the header analysis of a packet and the transfer of other packets can be concurrently performed.

As long as the header information is being read from the header RAM 11 by the search engine 14, the packet buffer 12 is not used by the processor. Therefore, the transfer engine becomes accessible to the packet buffer 12 for transmission or transfer thereby avoiding the competition for access to the packet buffer 12 between the search engine 14 and the transfer engine 13. The area for storing the packets received from the network and the header thereof can be configured separately from the area for storing the packets transferred from the switch 20 and the header thereof. This isolated configuration facilitates the packet control.

The route table 15, the ARP table 16 and the filter/QoS table are configured independently of each other. Thus, the search engine 14 can access the tables individually for read or write operation, thereby making it possible to search for the routing information and the QoS at high speed. Further, in order to realize the high-speed routing, the pipelining process can be carried out. Each table and the pipelining process will be described in detail later.

FIG. 3 is a sequence diagram showing an outline of the operation of a network relaying apparatus.

First when a packet is input to a first network interface 30 through the network through a port, the first network interface 30 transmits it to the transfer engine 13. The transfer engine 13 stores the received packet in the packet buffer 12 (S301). Also, the transfer engine 13 extracts only the header of the input packet and by adding the internal header, forms header information, which is stored in the header RAM 11 (S301). The internal header will be described later.

The search engine 14 reads the header information by accessing the header RAM 11. Alternatively, the transfer engine 13 may transfer the header information stored in the header RAM 11 to the search engine 14. In the search engine 14, the number or address of the router, the RP and the port of the destination, the information on the next transfer route such as a MAC (media access control) address and the information for controlling the communication quality such as the QoS control information are searched for appropriately in accordance with the header information (S303). The search engine 14 writes the destination information including the number or address searched and the transfer control information including the action information such as the QoS information in the header RAM 11. The search engine 14 may alternatively transmit the transfer control information to the transfer engine 13.

In the transfer engine 13, an output packet is produced (S305) based on the packet stored in the packet buffer 12 and the header information (including the transfer control information) stored in the header RAM 11. The transfer engine 13 outputs the output packet thus produced to the destination. In the case where the transfer route is associated with any other routing processor 10, the transfer engine 13 sets the packet in queue for the buffer of the particular other routing processor 10, while in the case where the transfer route is associated with the network interface 30 of the local routing processor 10, the transfer engine 13 sets the packet in queue for the corresponding port 40.

The transfer route searched by the routing processor 10 is not necessarily single, but the packets can be cast to a plurality of routes at a time. In such a case, the packets can be set in queue for an appropriate buffer of each of the plurality of the routes.

Now, the configuration and the operation of the routing processor will be explained in detail. First, each memory will be explained. FIG. 4 is a diagram for explaining the packet buffer 12 and the header RAM 11.

FIG. 4A shows an example of the format of the packet stored in the packet buffer 12. The packet buffer 12 is supplied with packets from the network 50 or the switch 20. The packet format is that of an IP packet, for example, to which a layer-2 MAC header 401 is added. The IP packet includes, for example, a layer-3 IP header 402, a layer-4 header 403 and a payload 404.

The layer-2 MAC header 401 includes a source MAC address (SAMAC) constituting the physical address (hardware address) of the router which has sent the packet immediately before and a destination MAC address (DAMAC) constituting the physical address of the next router to receive the packet. The layer-3 IP header 402 includes a source ID address (hereinafter referred to as the SIP) constituting a source address (address of the transmission terminal) and a destination ID address (hereinafter referred to as the DIP) constituting a destination address (address of the receiving terminal). The layer-4 header 403 includes a source port (hereinafter referred to as the SPORT) indicating a protocol (upper-level application) and a destination port (hereinafter referred to as the DPORT). The payload 404 includes the user data. In addition, each header may store the TOS (type of service) indicating the order of priority and the information such as the protocol in the upper-level of the IP protocol. These information can be processed in the same manner as the information described above.

Also, FIG. 4B shows an example format of the header information stored in the header RAM. The header information is configured with, for example, the layer-2 MAC header 401 and the layer-3 IP header 402 in the packet format to which the internal header 405 is added as the control information. The internal header 405 includes the input line number, the output line number and the QoS control information. The internal packet format in the router is configured with the packet format of the network to which the internal header 405 is added. In the process, the internal packet can be formed of the information stored in the packet buffer 12 and the information stored in the header RAM 11. Also, the internal packet may be transferred from the information of the packet buffer 12 alone by storing the internal packet format including the internal header 405 in the packet buffer 12. The transfer control information such as the destination information and the action information searched by the search engine 14 can be written in the internal header 405.

FIG. 5 is a diagram for explaining each table used for route search.

As shown in FIG. 5A, the entries in the route table 15 include, for example, the destination IP address 501, the IP address 502 of the next router, the local router transmission RP number 503 and the transmission port number 504. Also, as shown in FIG. 5B, the entries in the ARP table 16 include the IP address 502 of the next router and the MAC address 506 of the next router. Further, as shown in FIG. 5C, the entries of the filter/QoS table 17 include, for example, the value (range) 507 of the IP header/layer-4 header and the action 508. The action 508 includes the filtering process for passing or discarding a packet, the tunneling process for encapsulating or not encapsulating a packet and QoS. Especially, QoS will be explained later again.

Figure 6:
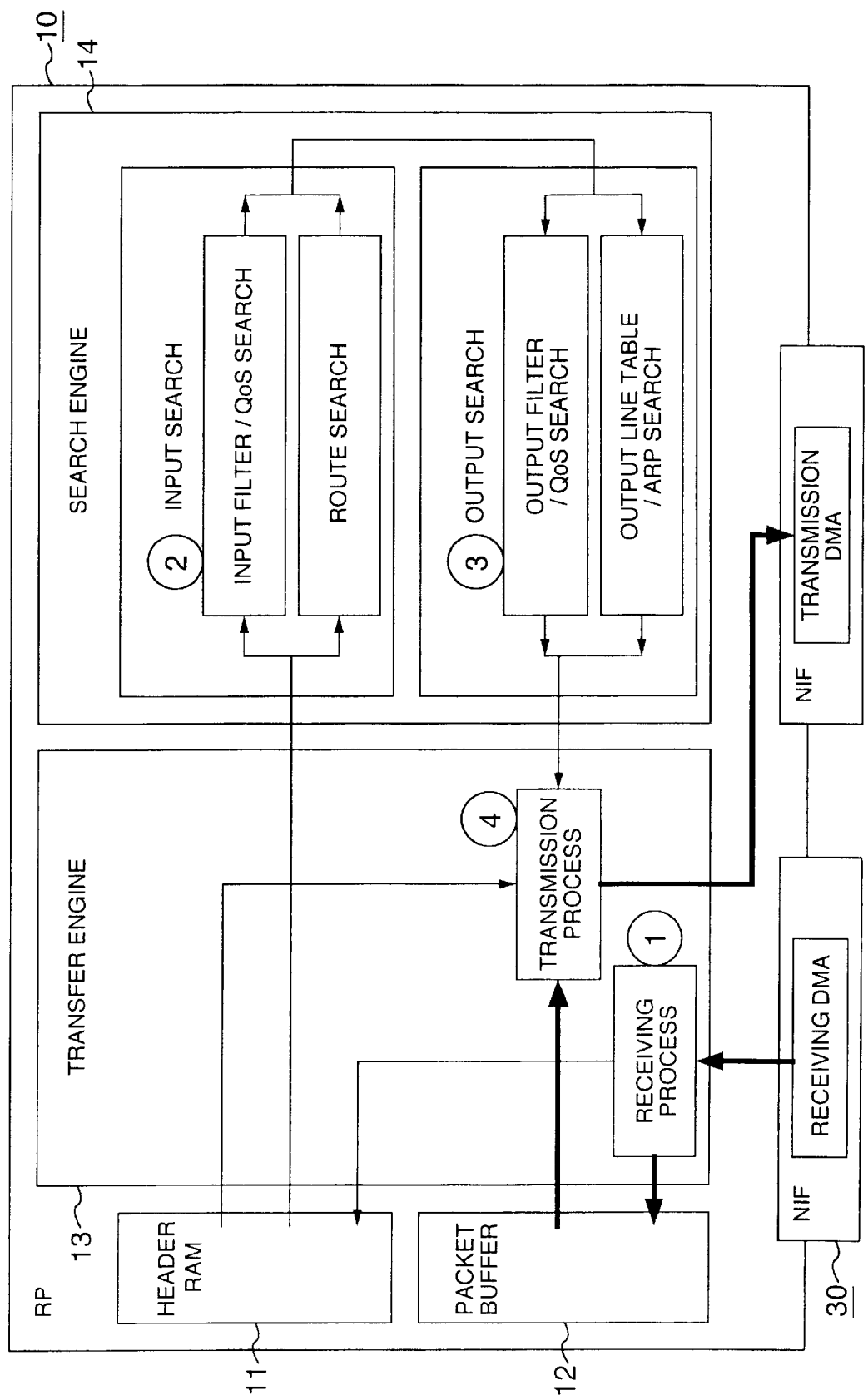
FIG. 6 is a diagram for explaining the high-speed processing in the routing processor.

FIG. 6 is a diagram for explaining the high-speed processing of the routing processor. With reference to this diagram, a method of realizing the packet transfer capable of following a high line speed on the order of gigabits. The high speed is realized by parallel processing or pipelining of the routing. Now, the operation will be explained with reference to the format shown in FIGS. 4 and 5.

The routing process is divided roughly into the receiving process ①, the input search process ②, the output search process ③ and the transmission process ④.

First, in the receiving process ①, the transfer engine 13 receives a packet from the network interface 30. The packet buffer 12 has stored therein an input packet or a packet of the internal packet format with the internal header added thereto. Also, the internal header 405 is added to the layer-2 MAC header 401 and the layer-3 IP header 402 of the input packet to form the header information, which is stored in the RAM 11. The header RAM 11 can be read from and written into at high speed independently of the packet buffer 12, and by storing only the header information therein, the storage capacity can be reduced for further increasing the processing rate. The search engine 14 can access the extracted header information at appropriate timing.

Then, in the input search process ②, the search engine 14 extracts the destination IP address in the layer-3 IP header 402 from the header information, and based on this address, refers to the route table 15 to search for the IP address 502 of the next router, the transmission RP number 503 of the local router and the transmission port number 504. Further, the search engine 14, based on the reference information of the layer-3 IP header 402 and the layer-4 header 403, searches the various items of the action 50 such as QoS on the input side from the received header information with reference to the filter/QoS table 17. These input-side filter/QoS search and route search are can be executed concurrently since the tables are independently prepared.

Then, in the output search process ③, the search engine 14 extracts the IP address of the next router determined in the input search process ②, and based on this address, searches for the MAC address 506 of the next router with reference to the ARP table 16, while at the same time searching for various items of the action 508 on the output side such as QoS with reference to the filter/QoS table 17. The output filter/QoS search and the line table/ARP search can be concurrently executed since each table is prepared independently. The transfer control information including the destination information such as the number/address information of the next destination determined and the action information such as the QoS control information are stored in the header RAM 11. These information can be written, for example, in the internal header 405 or at another appropriate position in the header information.

Then, in the transmission process ④, the header information including the transfer control information searched in the output search process ③ is read from the header RAM 11, and based on the header information and the packet buffer 12, an output packet is produced and set in queue for the buffer of the network interface 30, another routing processor 10 or the routing manager 60.

Figure 7:
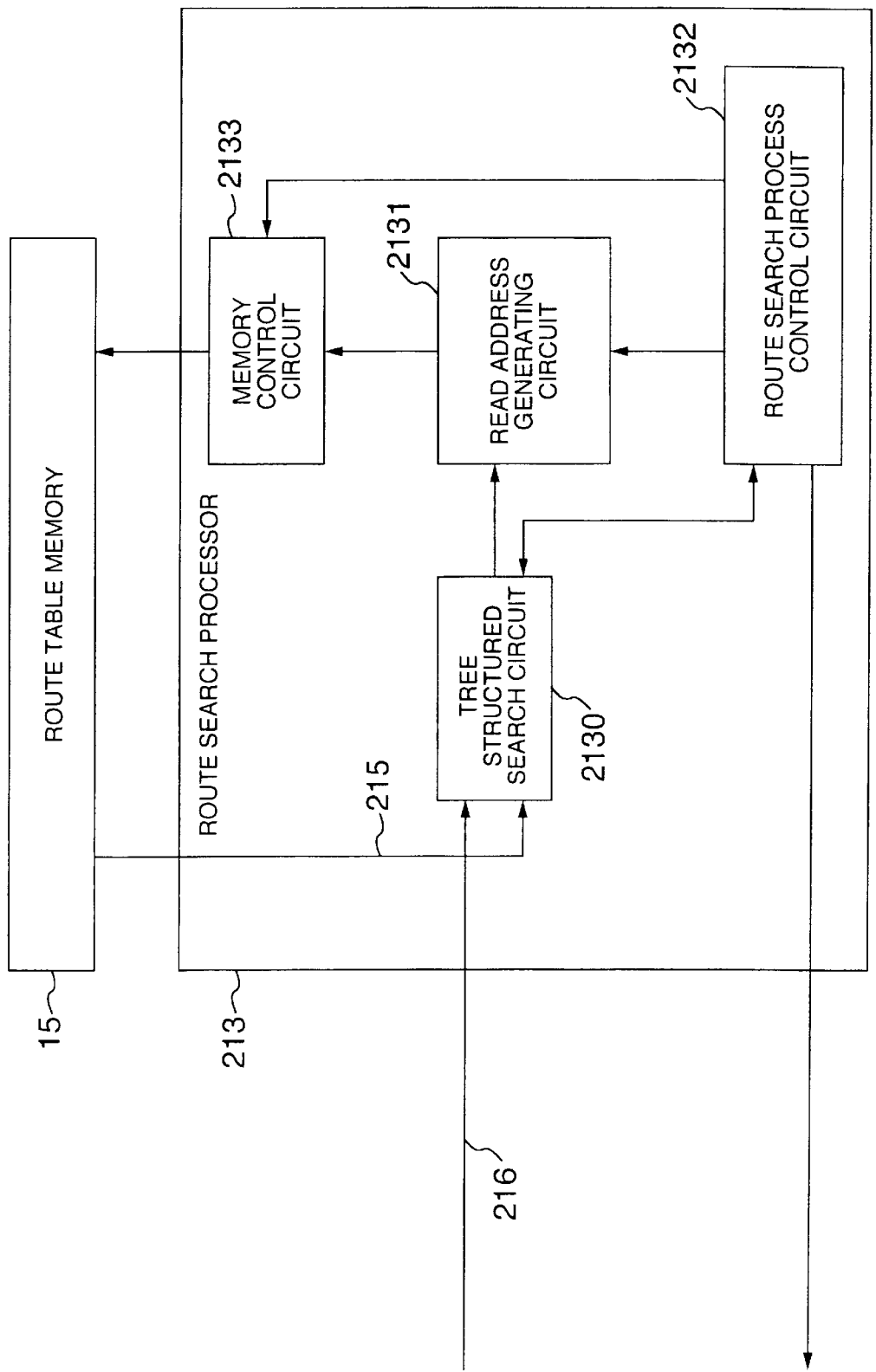
FIG. 7 is a diagram showing a configuration of a search engine in hardware.

FIG. 7 shows an example of the configuration of a search engine in hardware.

The search engine 14 can search the tables including the route table 15, the ARP table 16 and the filter/QoS table 17 for the required data by a tree structure, for example. Now, an explanation will be given of the route search processor for searching for a destination route using the route table 15 as an example of the processor of the search engine 14 configured in hardware.

The route search processor 213 includes a tree structured search circuit 2130, a read address generating circuit 2131 and a route search processing control circuit 2132. The tree structured search circuit 2130 searches the tree structure of n branches (where n is a power of 2) stored in each table such as the route table 15 to generate the pointer of the node next to be read, extract the check bit of the destination IP address of the received packet, determine the end of the tree structure search and update the candidate for the route information resulting from the search. The read address generating circuit 2131 generates the memory address of a part of the words of the node actually read, in accordance with the check bit value and the pointer to the node to be read output from the tree structure search circuit 2130. The route search processing control circuit 2132, on the other hand, controls the route search processor 213 as a whole (the operation timing and the operating condition of each circuit).

Now, the operation of the route search processor 213 will be explained.

The tree structure search circuit 2130 receives the destination IP address of the received packet from the header RAM 11, and based on this destination IP address and the node mask length, generates the pointer to the next node and delivers it to the read address generating circuit 2131. Also, the tree structured search circuit 2130 extracts the value of the check bit position (check bit value) of the destination IP address indicated by the node mask length and delivers it to the read address generating circuit 2131.

The read address generating circuit 2131 generates a memory address where the node data to be read is stored, using the pointer to the node, the check bit value and the timing signal from the route search processing control circuit 2132, and transmits it to the memory control circuit 2132. The memory control circuit 2132 generates a memory control signal using the memory address and the timing signal from the route search processing control circuit 2132 and transfers it to the route table 15. The route table 15 that has received this memory control signal transfers a corresponding node data to the tree structured search circuit 2130 using the signal line 215.

The tree structured search circuit 2130 makes a search using this node data and in the case where it is determined to end the tree structured search, outputs a tree structured search end signal to the route search processing control circuit 2132. The route search processing control circuit 2132 checks a flag with entry in the route information held in the tree structured search circuit 2130, and in the case where the value of the flag is 0, ends the route search process and notifies the transfer engine 13 of the absence of the search result. In the case where the value of the flag with entry is 1, on the other hand, the route information is output to end the search process and the next packet processing is controlled.

Figure 8:
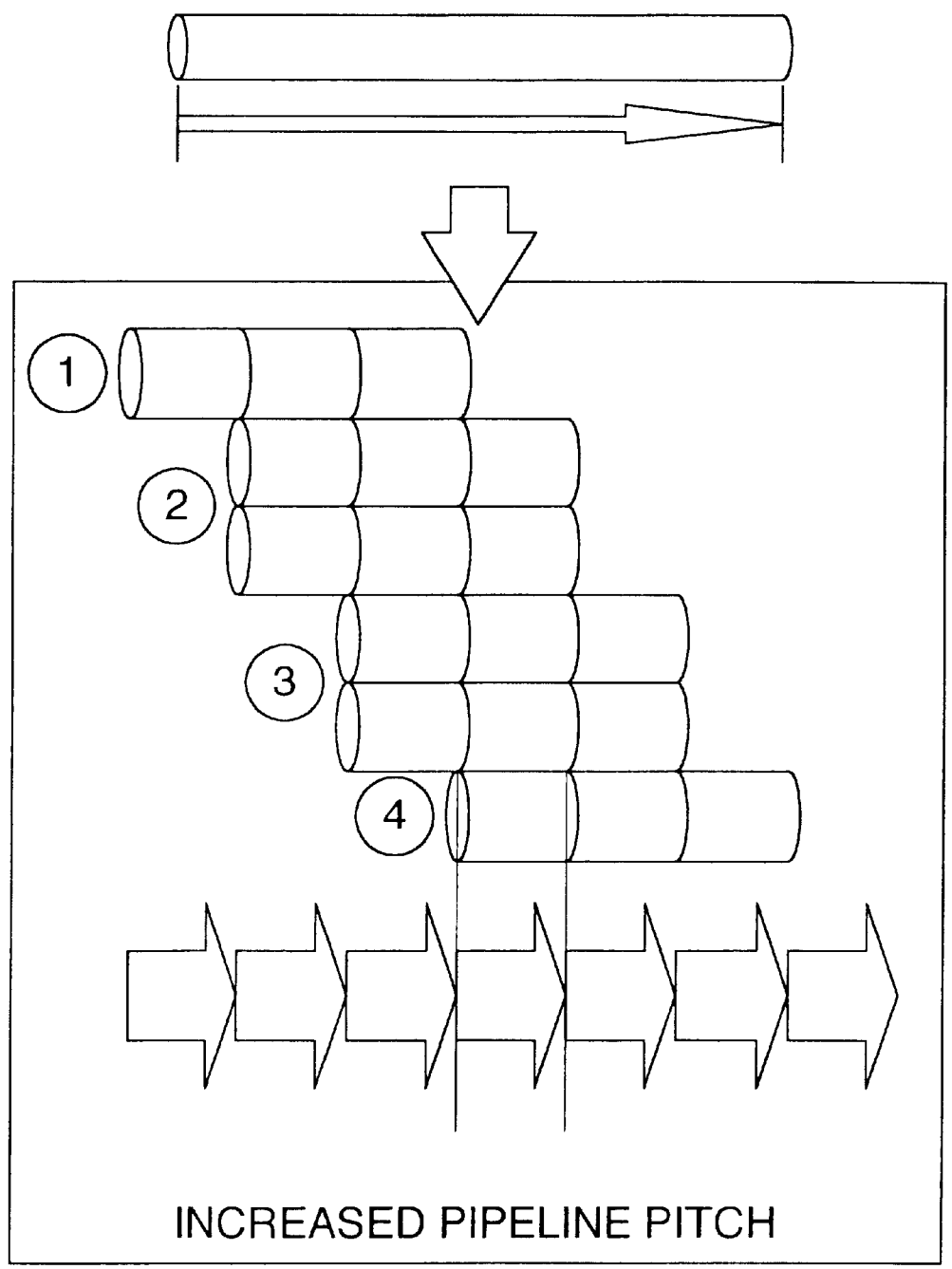
FIG. 8 is a diagram for explaining the high-speed processing by pipelining control.

Now, FIG. 8 is a diagram for explaining the high-speed processing by the pipelining control. As shown, the receiving process ①, the input search ②, the output search process ③ and the transfer process ④ are carried out by pipelining and thus controlled so that each processor is in constant operation for increasing the speed of the routing process. In the case under consideration, further, the input filter process (input filter/QoS search) and the route table search (route search) are executed in parallel in the input search ②. Also, the output search process ③, the output filter process (output filter/QoS search) and the output line table search (output line table/ARP search) are executed in parallel. The pipelining is not limited to the structure shown in FIG. 8 but can be implemented in an appropriate sequence.

In the pipelining process, upon completion of the first process of the entry N by the processor 1 of all the processors described above, the processor 1 starts the process on the entry N+1 regardless of whether the second process of the entry is completed by the processor 2 for executing the second process subsequent to the first process. This pipelining process can handle N entries in one procession session and therefore the processing speed is quadrupled. In the case described above, the flow search is processed by pipelining divided into four processes. If the process is divided into P processes for pipelining, on the other hand, the performance will be improved by a factor of P.

Figure 9:
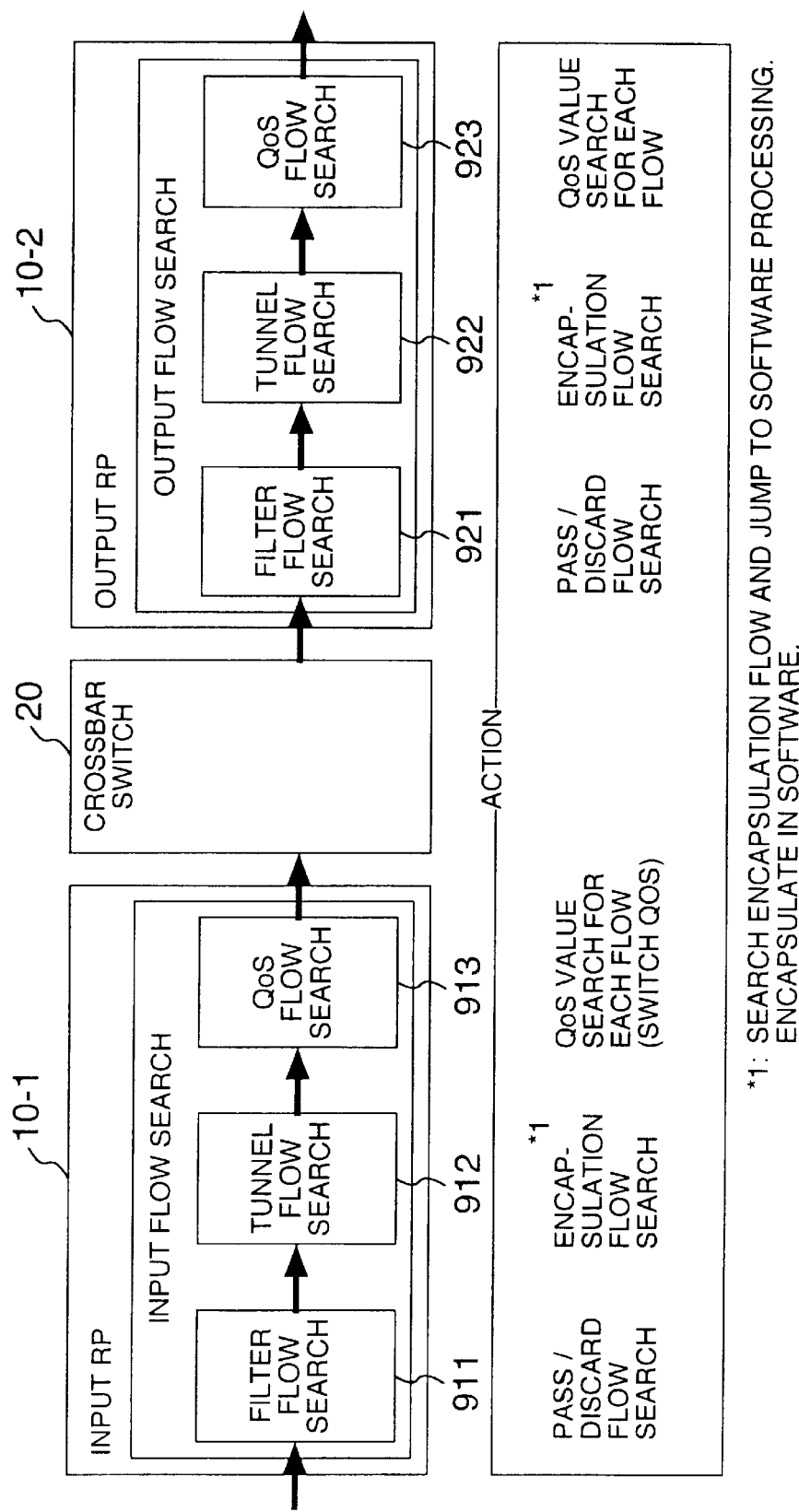
FIG. 9 is a diagram for explaining the flow search processing.

FIG. 9 is a diagram for explaining the flow search process.

Generally, a network relaying apparatus such as a router lacks a preset connection, and therefore has no connection information unlike in the ATM switch nor QoS control information in the connection information table (packet type communication). As a result, for the router to perform the QoS control, the flow search means for searching the QoS control information with the information in the header is required for each input packet in addition to the priority transfer function like the ATM switch. As an example, as described below, the priority transfer function is applied to the searched QoS control information by the flow search means. In this case, the conditions for identifying the packets produced by combining such information as the internal information of the header are called the flow conditions, a series of traffic coincident with the flow conditions is called the flow, and to determine whether the input packet meets the flow conditions and to detect the QoS control information and the action information such as transferability information is called the flow search.

According to this embodiment, the QoS control is inserted in the routing processor 10-1 on input side and the routing processor 10-2 on output side, and also the QoS function is provided to the switch 20. The routing processor 10-1 on input side has an input search flow including a filter flow search 911, a tunnel flow search 912 and a QoS flow search 913. In similar fashion, the routing processor 10-2 on output side has an output search flow including a filter flow search 921, a tunnel flow search 922 and a QoS flow search 923. The switch 20 has the arbitration function for selecting the order of transmission according to the priority thus providing the QoS function. The switch 20, like the routing processors 10-1 and 10-2, can be provided with the filter flow search, the tunnel flow search and the QoS flow search.

The filter flow search 911, 921 determines whether the packet is passed or discarded. The tunnel flow search 912, 922 determines whether the packet is encapsulated or not, and in the case where it is encapsulated, executes the encapsulation software.

The QoS flow search 913, 923 includes the packet priority control, the packet discard control and the band control, for example. The priority control is the one for transmitting the data of high importance degree or data of the real time system in priority. The discard control is the one for discarding the data of low importance degree in the case of heavy traffic or a fault for preventing the loss of important data. The band control, on the other hand, is for segmenting a line into a plurality of bands or changing the bandwidth. For example, the priority control and discard control can be accomplished by controlling the traffic using the matrix of priority class and discard class. In such a case, according to the priority class, the HNA/SNA (Hitachi network architecture/Systems network architecture), voice and animation can be controlled to small delay, while FTP (file transfer protocol), mail and WWW (World Wide Web) web can be controlled to large delay. According to the discard class, on the other hand, a small discard rate can be set for the control packets and a large discard rate for the voice and animation.

Now, the QoS control by the switch 20 will be explained. The packet sent from the routing processors 10 contains the QoS control information in the control information. The switch 20, especially on output side, carries out the priority control using the QoS control information. Actually, however, this can be accomplished by the output control by setting in queue in the order of priority. As a result, the communication and transfer of an even higher quality is made possible.

Figure 10:
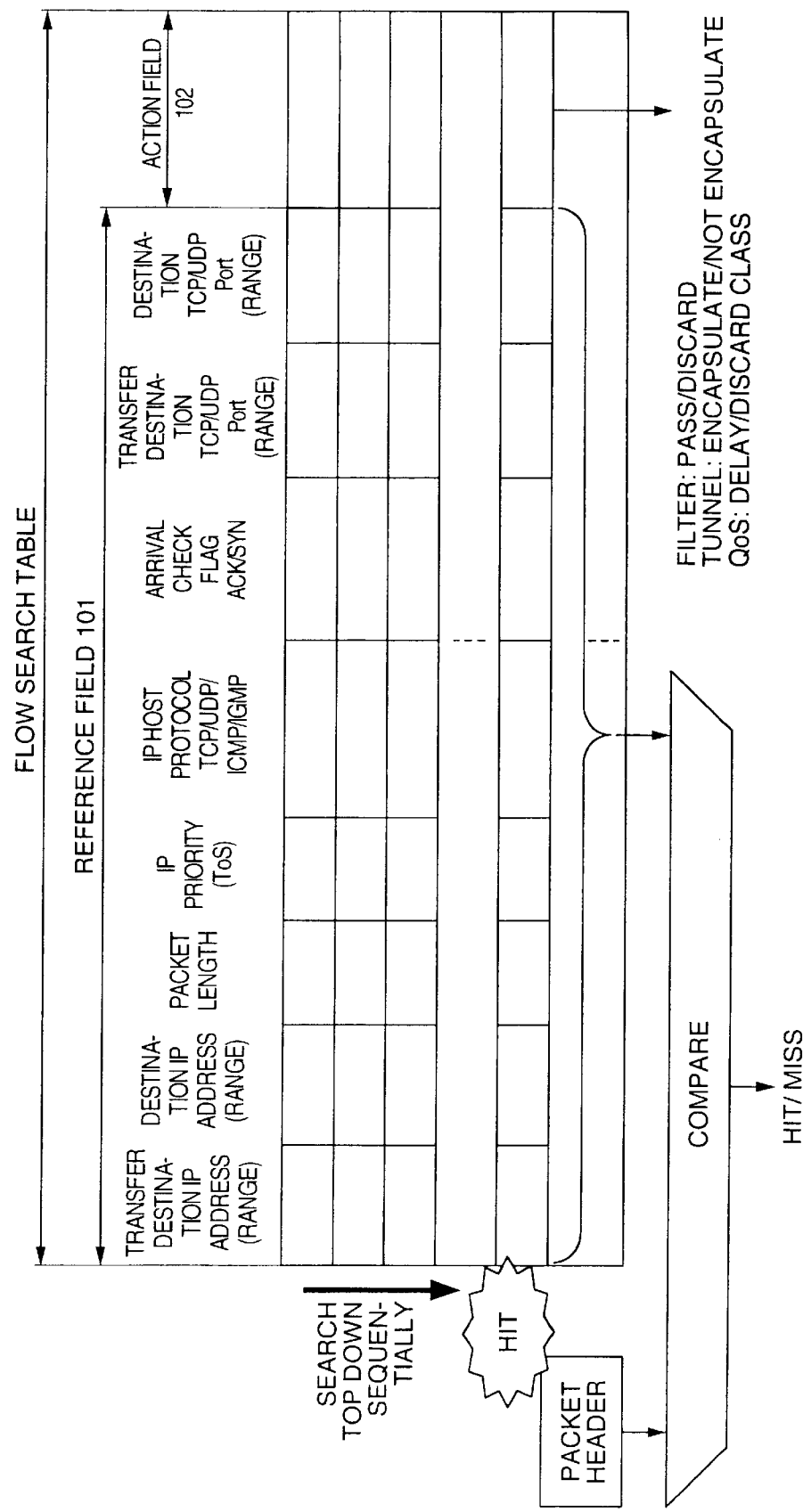
FIG. 10 is a diagram for explaining a flow search table.

FIG. 10 is a diagram for explaining the flow search table.

This flow search table corresponds to the filter/QoS table 17 described above. As an example, as shown in FIG. 10, a reference field 101 includes the source IP address, the destination IP address, the packet length, the IP priority, the IP host protocol, the arrival check flag, the transfer destination TCP/UDP port and the final destination TCP/UDP (Transmission Control Protocol/User Datagram Protocol) port. An action field 102, on the other hand, stores therein a filter (pass/discard), a tunnel (encapsulate/not encapsulate) and QoS (delay class, discard class, band, etc.).

Now, a specific method of QoS flow search will be explained. Take the QoS flow search as an example. A similar method can be employed also for the filter flow search or the tunnel flow search. The control information of the respective flows can be stored in mixture in the action field 102, or a flow search table can be prepared for each flow.

First, the linear search method will be explained. In this method, when determining the QoS control information as one action, the preset entries are read sequentially top down from the entry table, and then it is determined whether the values of the header of the packet are all coincident with the valid flow conditions in the reference field 101. In the case of coincidence, the QoS control information in the action field 102 in the entry is determined as the packet QoS control information and the QoS flow search is ended. Once the coincidence with the flow conditions is searched for successfully, the QoS control information in the action field 102 is determined as the QoS control information so that the flow search is ended without executing the next entry search.

In the linear search method described above, it may be difficult to execute the QoS control or filtering at high speed in the network in which a large amount of entries are set. In view of this, the flow search method according to this embodiment desirably employs an input line limiting method or the like in which the flow search can be carried out more rapidly than in the linear search method even in the case where a large amount of entries are set. The input line limiting method will be explained briefly below. In the input line limiting method, only the entries coincident with the input line number making up the reference field of the linear search method are searched to assure high speed.

Figure 11:
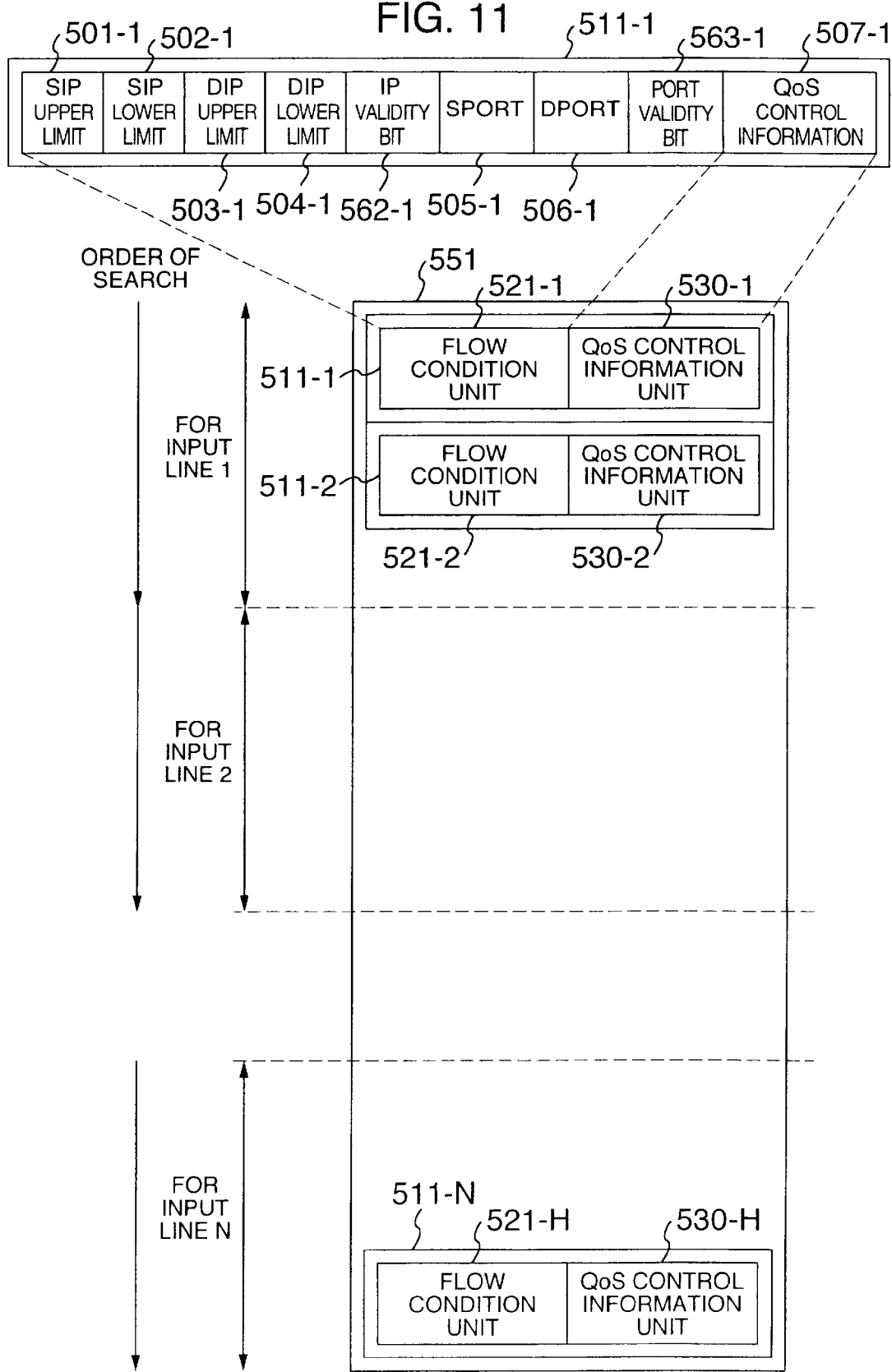
FIG. 11 is a diagram for explaining a first input line limiting system.

FIG. 11 is a diagram for explaining a first input line limiting method. In the first input line limiting method, an entry 511-$i$ with the input line number and the input line number valid bit deleted from the reference field of the linear search method is set for each input line. The flow condition unit 521-$i$ includes the SIP upper limit 501, the SIP lower limit 502, the DIP upper limit 503 and the DIP lower limit 504 indicating the condition for identifying the source or destination user, an IP validity bit 562 indicating the validity of the upper limits and the lower limits of SIP and DIP, the SPORT 505 providing a source port, the DPORT 506 providing a destination port, and a port validity bit 563 indicating the validity of the SPORT 505 and the DPORT 506. The QoS control information unit 530-$i$ includes, for example, the QoS control information 507 used for the priority transfer function. Only the entry 511-$i$ having a coincident input line number providing the flow condition is searched, and therefore the input line number is not required in the entry 511-$i$. At the time of flow search, only the entry 511-$i$ with the input line thereof assigned a packet is searched.

According to the first input line limiting method described above, assuming that the entry 511-$i$ not related to the input line number is set (set, for example, as "the traffic of Telnet input from all the input lines is given high priority"), the entries 511-$i$ in the same number as the input line number (=N) are required to be set sometimes leading to a deteriorated efficiency of the memory for realizing the entry table. In view of this, an explanation will be given below of an input line limiting method of higher speed.

Figure 12:
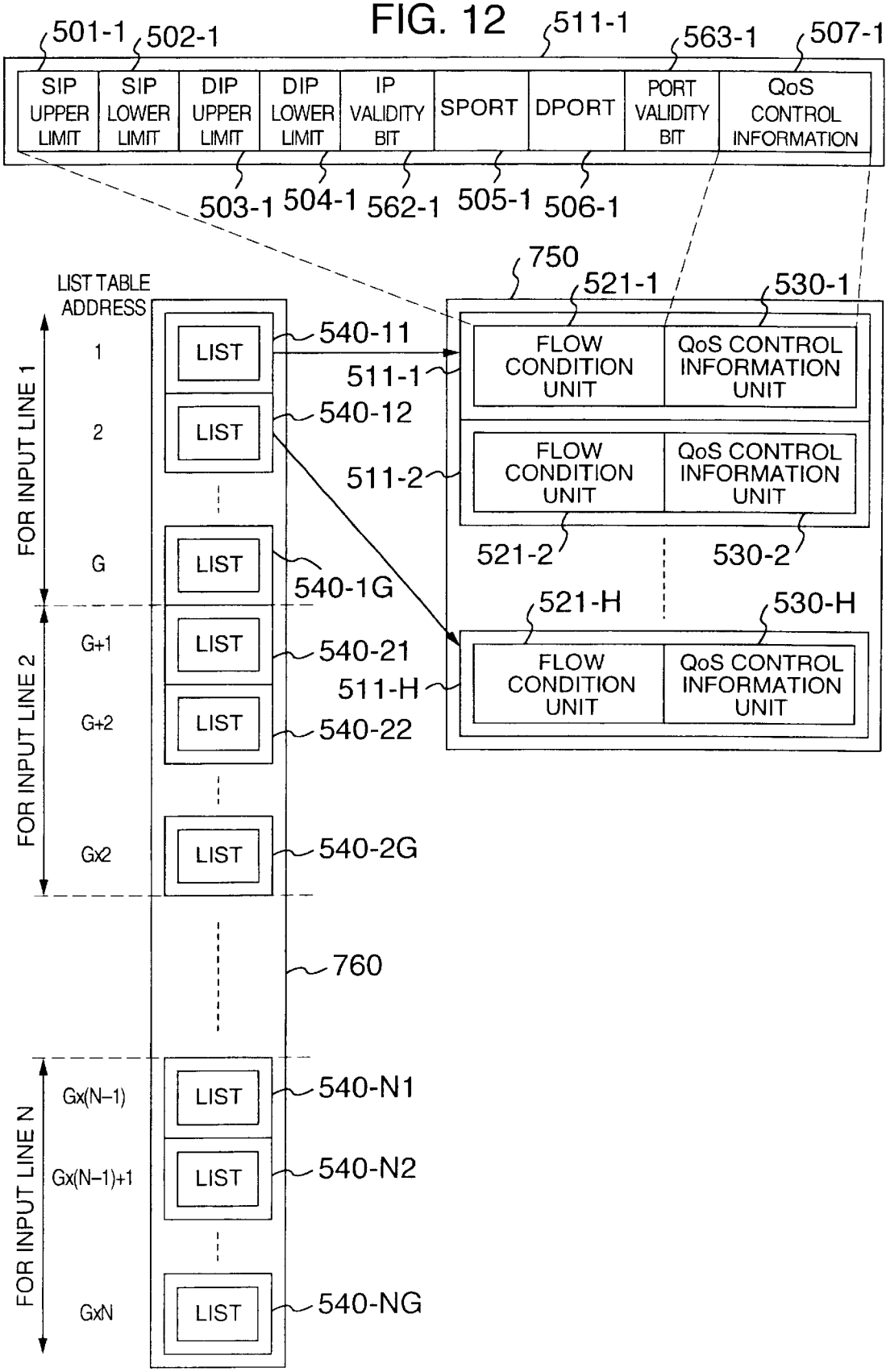
FIG. 12 is a diagram for explaining a second input line limiting system.
Figure 13:
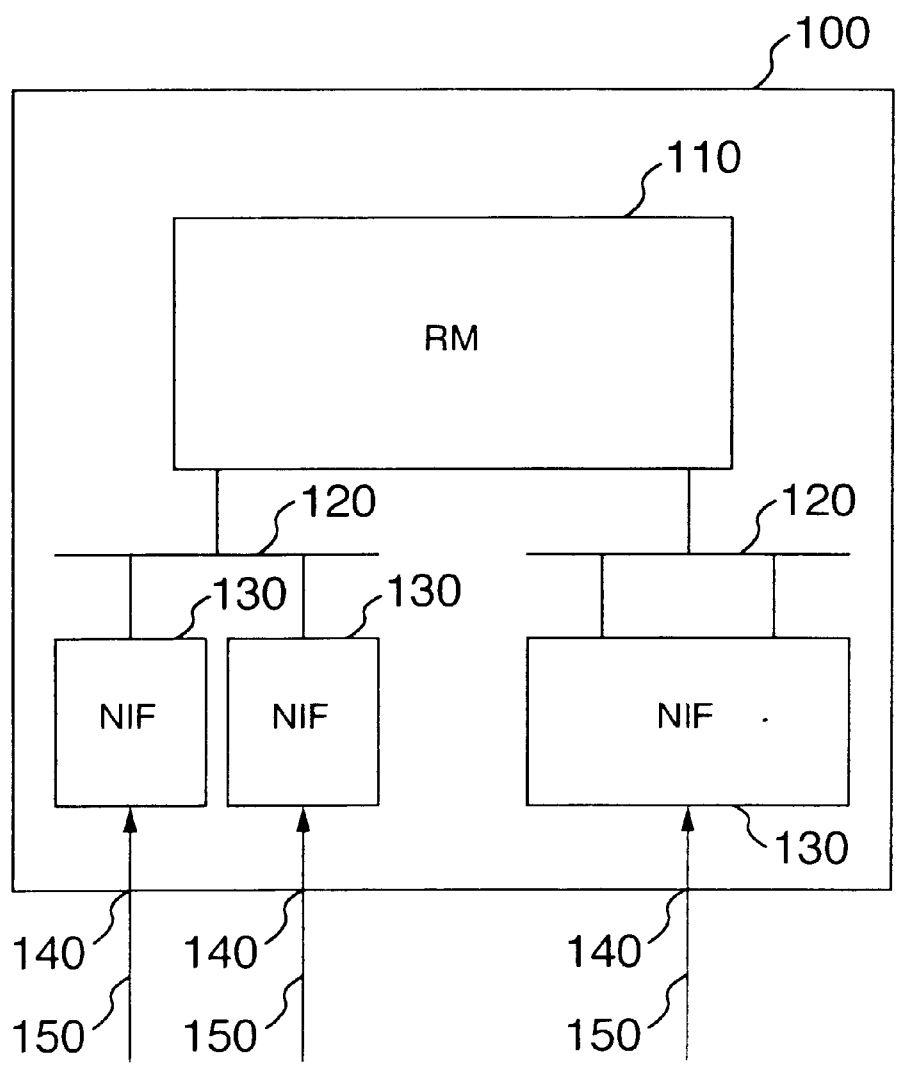
FIG. 13 is a diagram showing a configuration of a conventional network relaying apparatus.

FIG. 12 is a diagram for explaining a second input line limiting method. In the second input line limiting method, the lists 540 constituting the addresses in the entry table 750 is set in the list table 760 for each input line. For example, the list 540-11 having the list table address "1" is the address of the entry 511-1, and the list 540-12 having the list table address "2" is the address of the entry 511-H. At the time of flow search, only the list 540 assigned to the input line supplied with a packet is read, and the entry 511-$i$ pointed to by this list 540 is read out. The memory for implementing an entry table can be effectively used if a list 540 having a small bit width (for example, about 10 bits for as many as 1024 entries) is held for each input line and an entry 511-$i$ having a large bit width is shared by the input lines. As a result, a multiplicity of entries 511-$i$ can be set while realizing a high speed operation at the same time.

Another example of the flow detection method is the output line limiting method. In the output line limiting method, only the entry 511-$i$ for which the output line number providing the flow condition is coincident is processed in the same manner as in the input line limiting method described above for realizing a high-speed flow detection. A SAMAC limiting method is available which uses SAMAC instead of the input line number in the header information as the flow condition. In the SAMAC limiting method, the SAMAC group is defined and the entry is limited by the SAMAC identifier providing a SAMAC group identifier, so that the flow search similar to the input line limiting method can be executed.

As will be understood from the foregoing description, according to this invention, there is provided a network relaying apparatus and method for routing packets at high speed while assuring a high communication quality (QoS), a high reliability and security. Also, according to the invention, the high applicability and expandability can meet the requirement for a multiplicity of lines and a great variety of sizes on the one hand and facilitates the improvement of the system performance on the other. Further, the present invention facilitates the connection with the existing systems by increasing the types of protocols that can be processed.

Furthermore, according to the invention, the search including the route search can be carried out at high speed by segmenting the storage unit and using a part thereof as a high-speed memory. Also, according to the invention, the competition for access to the memory storing the packets can be suppressed and thus the packet processing capacity can be improved without limiting the number of the network controllers that can be incorporated in the system or without using a high-speed memory unit or a dual-port memory unit. Further, according to this invention, while the processor of the search engine reads the header information from the header RAM, the packet buffer is not used by the processor. Therefore, the transfer engine can access the packet buffer for packet transmission or transfer, thereby preventing the competition for access to the packet buffer between the search engine and the transfer engine.

What is claimed is:

1. A network relaying apparatus connecting a plurality of networks for transferring packets input from the networks to the next destination based on route information, comprising:

a plurality of network interfaces connected to the networks for controlling the interface with the networks;

a plurality of routing processors;

a routing manager for managing the internal parts of the apparatus; and a connector for connecting the routing manager and a said plurality of the routing processors respectively;

each of said plurality of routing processors comprising:

a packet buffer storing an overall input packet including a header and data;

a fast readable and writable header memory accessible to said packet buffer asynchronously therewith, and storing header information including the header of the input packet and an internal header;

a transfer engine performing a receiving processing and a transmitting processing, said receiving processing including storing the input packet received from the network or said connector to said packet buffer and adding the internal header to the packet header to produce header information and storing the produced header information in said header memory, and said transmitting processing including reading out the input packet from said packet buffer, producing an output packet from said input packet stored in said packet buffer and the header information stored in said header memory and outputting the output packet to said connector or said network;

a search engine searching a transfer destination based on the header information stored in said header memory and writing transfer destination information thus searched into the internal header stored in said header memory;

wherein the network interface outputs the packets input from the networks to a first routing processor connected with the network interface;

wherein a transfer engine of the first routing processor stores the input packets in a packet buffer and the header information on the input packets in a header memory;

wherein a search engine of the first routing processor searches for the destination of the input packets stored in the packet buffer based on the header information stored in the header memory and stores the destination information in the header memory;

wherein said transfer engine of the first routing processor produces an output packet from the input packet stored in the packet buffer and the header information stored in the header memory and wherein outputs the output packet to the connector when the searched route to the destination is passed through a second routing processor; and wherein the connector transmits the output packet from the first routing processor to the second routing processor of the searched destination, based on the destination information included in the internal header of the output packet.

2. A network relaying apparatus according to claim 1, wherein said transfer engine of said first routing processor, when the route to the searched destination is passed through said first routing processor, applies an output packet to the port connected to said route of said network interface.

3. A network relaying apparatus according to claim 1, wherein:

said transfer engine of said second routing processor stores the input packet from said connector in a packet buffer and the header information on said input packet in a header memory;

said transfer engine of said second routing processor searches for the destination of the input packet stored in said packet buffer based on the header information stored in said header memory; and said transfer engine of said second routing processor prepares an output packet from the input packet stored in said packet buffer and the header information stored in said header memory, and output the output packet to the port connected to said route of the network interface connected to the first routing processor.

4. A network relaying apparatus according to claim 1, wherein said transfer engine and said search engine of said routing processor are constructed in hardware independently from each other.

5. A network relaying apparatus according to claim 1, wherein said routing processor searches for a plurality of routes as destinations and multicasts the output packets to the routes searched.

6. A network relaying method for a network relaying apparatus comprising network interfaces connected to networks, routing processors for routing packets input from the network interfaces, a routing manager for managing internal parts of the apparatus, a connector for connecting a plurality of the routing processors, and means for outputting the packets input from the networks to the destination, comprising the steps of;

causing a first network interface to output the packets input from the network to a first routing processor connected with the first network interface;

causing a transfer engine of a first routing processor to store overall input packets in a packet buffer and header information on the input packet and internal header information in a high-speed readable and writable header memory independent of the packet buffer;

causing a search engine of a first routing processor to access the header memory and search for a destination of the input packet stored in the packet buffer based on the stored header information;

causing said search engine of the first routing processor to write the searched destination information into said header memory, as an internal header;

causing the transfer engine of the first routing processor to produce an output packet from the input packet stored in the packet buffer and the header information and the internal header information stored in the header memory;

causing the transfer engine of the first routing processor to output the output packet to the connector in the case where the route to the searched destination passes through a second routing processor; and causing the connector to transmit the output packet input from the first routing processor to the second routing processor based on transfer destination information contained in the internal header of said output packet.

7. A network relaying apparatus connected with a plurality of networks for transferring packets input from the networks to the next destination based on route information, comprising:

a plurality of network interfaces connected to the networks for transmitting and receiving to and from said networks packets composed of a header and data;

a plurality of routing processors connected to one or a plurality of network interfaces for routing the packets input from the network interfaces;

a routing manager for managing the internal parts of the apparatus; and a connector for connecting the routing manager and said plurality of the routing processors, respectively;

each of said plurality of routing processors comprising:
a packet buffer storing an overall input packet;
a header memory accessible to said packet buffer asynchronously therewith and storing header information including the header of the input packet and an internal header;
a transfer engine storing a packet input from said network interface or said connector in said packet buffer, storing the header of the input packet and said internal header in said header memory, as header information, producing an output packet from the input packet stored in said packet buffer and the header information stored in said header memory, and outputting the produced output packet to said connector or said network interface; and
a search engine searching a transfer destination based on the header information stored in said header memory and writing transfer destination information thus searched as part of the internal header in said header memory;

wherein the connector transmits the output packet from said transfer engine of the routing processor to any of the routing processors based on the destination information included in the internal header of the output packet.

8. A network relaying apparatus according to claim 7, wherein said routing processor further comprises a route memory storing routing information, in response to inputting of a packet from said network interface, said search engine reads out a destination IP address from the header stored in said header memory, searches said routing information of said route memory using said destination IP address, and extracts said transfer destination information including an IP address of the transfer destination.

9. A network relaying apparatus according to claim 8, wherein said routing processor further comprises an address memory storing a plurality of IP addresses and a plurality of MAC addresses that are correlated with each other, in response to inputting of a packet from said connector, said search engine reads out an IP address of a transfer destination from the internal header stored in said header memory, and searches a MAC address correlated with an IP address stored in said transfer destination.

10. A network relaying apparatus system according to claim 8, wherein said routing manager distributes said routing information to each of said routing processors, and said each routing processor stores said distributed routing information in said route memory.

* * * * *